United States Patent [19]
Firmin

[11] 3,958,358
[45] May 25, 1976

[54] FISHING LURE

[76] Inventor: Herman P. Firmin, 11325 Granberry St., Baton Rouge, La. 70811

[22] Filed: Oct. 1, 1974

[21] Appl. No.: 510,983

[52] U.S. Cl. .............................. 43/42.51; 43/42.27; 43/42.35
[51] Int. Cl.² ........................................ A01K 85/00
[58] Field of Search ............... 43/42.26, 42.27, 42.2, 43/42.46, 42.11, 42.34, 42.35, 42.13, 42.51, 42.1, 44.8, 42.25, 42.36, 42.37, 42.38, 42.06

[56] References Cited
UNITED STATES PATENTS

| | | | |
|---|---|---|---|
| 2,152,948 | 4/1939 | Bocchino | 43/42.36 |
| 2,242,708 | 5/1941 | Lancaster | 43/42.27 |
| 2,325,107 | 7/1943 | Burns | 43/42.1 |
| 2,952,936 | 9/1960 | White | 43/42.21 |
| 3,093,923 | 6/1963 | Jackson | 43/42.2 |

Primary Examiner—Louis G. Mancene
Assistant Examiner—Peter K. Skiff
Attorney, Agent, or Firm—Llewellyn A. Proctor

[57] ABSTRACT

A fish lure, for use in fishing with a rod, line and hook, and usually a reel, in the form of an elongated body member, and paired wings carried as bifurcated rearward projections, aerodynamically designed in arc shape. The lure preferably contains various appendages and parts, and is constructed of soft, flexible plastic such that it resembles an insect. On attachment via a line to a rod, the lure can be cast and, on movement through the air, it rotates to impart torque within the line. On striking the surface of the water, a counter-rotation is set up as the torque within the line is released, the counter-motion creating life-like or live action resembling that of a wounded insect thrashing the surface of the water, this arousing the curiosity and rapacity in fish. A hollow form of the lure also permits it to dip and dive beneath the surface of the water.

9 Claims, 3 Drawing Figures

FISHING LURE

Sport fishing, or angling, has come to mean fishing with rod, reel, line and hook. For example, in fly-fishing and in bait casting or spinning, two of the basic methods employed in sports fishing, anglers generally employ an artificial bait or lure and, while the techniques of fishing and the equipment used vary in degree, when the lure is drawn in by a line through water or when influenced by current, it resembles (at least in the eyes of the aquatic beholder) a natural bait. In sports fishing, the angler often, in fact, seeks by various lure designs to imitate the small creatures that inhabit the land and live in or near the water on which fish have come to depend as its natural food. Sometimes the lures are designed to resemble nothing found in nature, but the purpose of all lures is, of course, to arouse the curiosity and rapacity in fish.

In fishing, the angler generally uses lures made with silk, fur, feathers, wood, metals, plastics and other materials in life-like forms which imitate fish, shrimp, frogs, worms, insects and the like. The lures, which are of various colors and shapes, are provided with an appended hook, or hooks; or a hook is wholly or partially concealed within the material of which the lure is constructed. Lures are often designed to spin, wobble or wiggle and even to gurgle, pop, and dip or dive through the water to better imitate life forms which, as suggested, will excite and arouse the curiosity and rapacity of the fish.

In this country a wide variety of lures is known, many of which are now made of pliable plastic in numerous shapes, colors, sizes and weights, and which behave in a most life-like way when drawn through water. In Great Britain the most popular lure for many years has been the Devon minnow, a cylinder of wood, metal or hard plastic fitted with two small fins which, in water, will cause it to spin. Spoons, i.e., spoon shaped metal lures which spin, wobble or vibrate, are used all over the world. Some lures are primarily designed to float on the surface of the water, some to sink, and others to dip and dive between the surface to a shallow depth below the surface, dependent on the type of fish intended to be attracted, hooked and caught. In efforts to create life-like, or live action in artificial lures, some lures have even been powered by batteries and other energy to produce motion, or light, and noise. The large number and variety of lures which have been designed and developed offer eloquent testimony of man's nature and continued desire to hunt and fish.

Accordingly, it is the primary objective of the present invention to provide a new and novel artificial bait or lure, particularly one designed to create its own life-like, or live action, the energy required for such action being generated at the time of casting.

More particularly, it is an objective to provide an artificial lure of such character which is especially suitable for fly-fishing and for use in bait casting or spinning.

A further object is to provide an artificial lure of such character of sturdy construction, and which can be structured in a variety of colors, sizes and shapes, preferably molded at relatively low cost.

These and other objects are achieved in accordance with the present invention, an article of manufacture constituting an artificial lure for use in fishing with rod, line, and hook, and usually a reel, characterized as comprising an elongated body member and a pair of alternately disposed balanced wings, each wing of the pair being formed as bifurcated, flattened, twisted segments extended rearwardly from said body constituting in its essence a single continuous helical rib projecting from said body of which it is an integral part. The fixed propeller-like wings are sized relatively to the body, and arced sufficiently such that the lure can be actuated and rotated on passage through the air. Pursuant to such design, the lure can be secured upon a hook attached via a line to a rod, and the lure cast such that on rotation of the lure on movement through the air, the line is twisted and a torque applied within the line. On striking the surface of the water, the rotation of the lure ceases but, due to the torque within the line, a counter rotation is set up such that the lure thrashes and paddles the surface of the water to create the life-like movements.

In a preferred embodiment, the lure is constructed of a soft, flexible plastic or plastic-like material, especially as a molded unitary member. Most preferably, the lure is one resembling an insect having the usual body, head capsule with eyes and mouth parts, appendages which resemble legs, antennae or other specialized parts, and wings aerodynamically shaped to provide the essential rotation of the lure on movement of the member through the air.

In accordance with another preferred feature, the lure is hollow so that it can be made to dip and dive beneath the surface of the water after the counter rotational movement on the surface of the water has been completed.

These and other features and advantages will be better understood by reference to the following detailed description and to the accompanying drawings to which reference is made in the description. In the drawings, similar numbers are used to represent similar parts or components in the different figures, and subscripts are used to designate a plurality of analogous parts or components. Where subscripts are dropped in the general discussion, subsequent to their introduction, the designations are intended to apply in generic sense.

Referring to the drawings.

Figure 3:
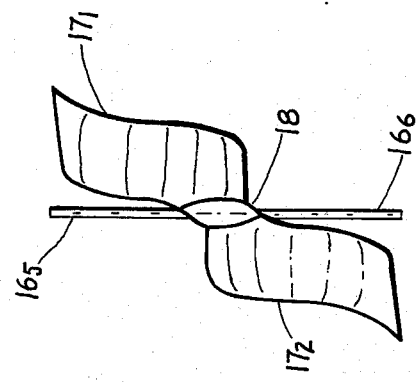
FIG. 3 is a right end view of the lure as displayed in FIG. 2 of the drawing.
Figure 1:
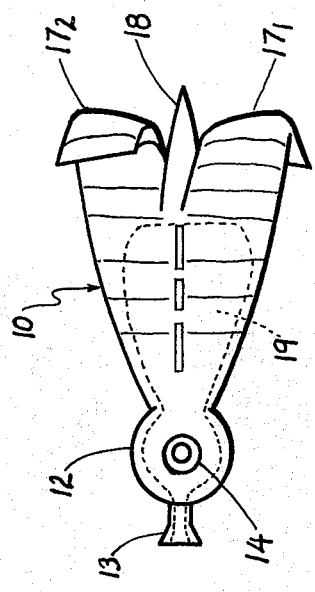
FIG. 1 is a top view of a preferred type of lure resembling a flying type of insect, constructed of a soft plastic.
Figure 2:
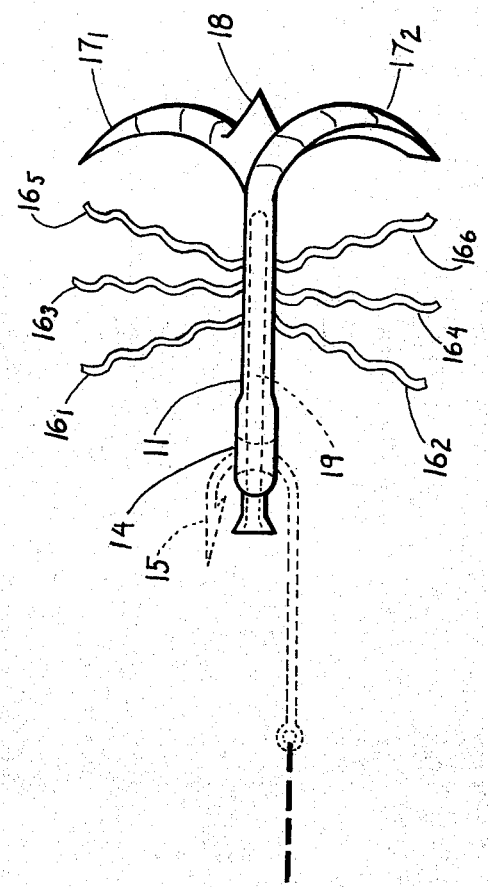
FIG. 2 is a side, or elevation, view of the lure depicted in the preceding figure.

Referring first to FIG. 1, there is shown a preferred type of artificial lure 10, preferably one which resembles a flying type of insect. The lure 10 can be constructed of essentially any solid or semi-solid material, but it is highly preferable to use a semi-solid, soft or flexible plastic or plastic-like material, especially a material of flesh-like consistency. A preferred type of soft plastic is one known as "worm type plastic" because of its wide use in the construction of plastic worm-type lures by artificial lure manufacturers.

The lure 10, shown in the several figures, is comprised generally of an elongate body 11, generally striated with circumferential parallel aligned striae such that it resembles the segmented abdominal portion of various insects. The forward portion of the elongate body is provided generally with a knobbed segment 12 containing a cylindrical and funnel shaped protrusion, or tubular nozzle 13. The knobbed segment 12, and nozzle 13, generally resemble the head, or head capsule of numerous kinds of insects which includes a number of fused segments which bear a variety of sense organs, highly modified mouth parts (as used for biting, chewing, sucking, lapping, etc.), antennae and various other appendages, some of which are usually specialized for eating, egg-laying or other particular functions. The knobbed segment 12, or head capsule replica, is also provided with an opening 14 cut completely therethrough which not only provides a facsimile of a pair of eyes, each on opposite sides of a head, but serves as a convenient means for securing the lure 10 upon a hook 15. This permits a quick change of lures without any necessity of imbedding a hook within the body 11 or head segment 12. A plurality of long, slender appendages $16_1, 16_2, 16_3, 16_4, 16_5, 16_6$, preferably as paired segmented appendages, are located one member of a given pair on opposite sides of the body 11, these being representative of appendages used by insects for walking, and the like. Such appendages 16, generally located at about the forward or mid-portion of the body 11 representative of the thorax portion of an insect, are generally balanced, i.e., an equal number of appendages of equal length being located on opposite sides of the body 11. The appendages 16 can be provided in a three-dimensional or off-set pattern, or aligned on a substantially common plane. They are reed-like and sufficiently flexible that they will readily vibrate with the least disturbance.

In its essence, the lure 10 necessarily includes, besides the body 11, a pair of balanced wings $17_1, 17_2$, each wing of the pair being located on opposite sides of body 11, 180° apart, and on the rearward end of body 11. Whereas, in general appearance, the pair of wings $17_1, 17_2$ appear folded, and sloped rooflike over the body 11 as wings projected from the prothorax (or meso thorax) portion of a flying insect, they are in reality bifurcated, flattened, twisted segments extended from, and one each of which is arced about, the body 11. The pair of wings $17_1, 17_2$ is propeller shaped or screw-like in appearance, and constitutes in its essence a single continuous helical rib, or thread, extending from the body 11 from which it is projected.

A spacer, or stiffner, 18 is generally located at the end of body 11, and between wings $17_1, 17_2$. The purpose of the stiffner 18 is to keep the wings $17_1, 17_2$ properly spaced and trained at the proper arched angle, and to keep the lure 10 well balanced. Suitably, the spacer or stiffner 18 can be set with the same twist and arc as the wings $17_1, 17_2$.

The lure 10 is aerodynamically designed, or designed in much the manner of an aircraft propeller which, although similar in principle to a marine propeller, must be actuated by air which is approximately one-eight hundredth the density of water at standard sea level conditions. The wings $17_1, 17_2$ of lure 10 are arched and designed so that the lure 10 will be actuated and spun, or rotated, as it is thrown through the air, and hence the pair of wings $17_1, 17_2$ are relatively large as contrasted with the overall size of the lure 10, or with the body 11. In this regard, each wing $17_1, 17_2$ of the pair is suitably as wide as, generally from about 1 to about 10 times wider, and preferably from about 2 to about 4 times wider than the average width of the body 11. Moreover, the sum total diameter of the arc circumscribed by the tips of the rotating wings $17_1, 17_2$ is preferably substantially equal to or greater than the length of the body 11. Suitably, the actual length of the lure ranges from about ½ inch to about 3 inches, depending on the type of fish to be attracted by the lure.

The structural shape and design of the wings $17_1, 17_2$ to simulate an aerial propeller is thus a key and novel feature of the present invention. Pursuant to such design, when the lure 10 is cast through the air, it will rotate and thereby twist the line or leader to which it is connected. Hence, the line or leader, subjected to such torsion as the lure 10 moves through the air, acts to relieve itself of such tension after the lure 10 strikes the water and is no longer actuated by movement through the air. The result is that a counter rotation of the lure 10 is produced after the lure 10 strikes the surface of the water. The lure thus commences to twist and squirm, creating a simulated live action, thrashing and paddling the water in a manner resembling that of an injured insect lying on the surface of the water. In such movements, the leg-like appendages 16 aid in the simulation of life-like action, the movement and vibration of these members making the lure 10 much more realistic of the thrashing and paddling of an insect, and therefore irresistable to fish.

In a preferred embodiment, the interior of the lure 10 is hollow, and the hollow portion thereof 19 is open via the head 12 and nozzle 13 to the lure exterior, such that it is possible for the lure 10 to take in water. When the thrashing and paddling action of the lure 10 has thus stopped such that it begins to lose its bouyancy, the lure 10, upset by the weight of the hook 15, begins to take on water and sinks. The lure 10 thus dives beneath the surface of the water, and creates further live action as it is moved through the water. When a new cast is made, as the lure 10 spins through the air, all of the water is slung out of the hollow portion 19 of lure 10 via the nozzle 13 so that the action can be repeated ad infinitum. A remarkable bonus effect which has been observed in the use of these lures is that fish often hook themselves and, having done so, apparently blow water against the lure 10 such that the lure rides up the straight portion of the hook, and onto the line or leader where it usually remains completely undamaged by the biting and chewing action of the hooked fish as it attempts to disengage itself from the hook.

A further feature of these lures 10 is that they can be readily manufactured by ordinary plastic injection molding techniques. Even the hollow body can be conveniently created after the liquid plastic has begun to set on the cool mold surface by release of the pressure and withdrawal of the unsolidified, or liquid, plastic from the center of the mold. The liquid plastic is thus withdrawn from the hollow portion 19 of the lure form via extrusion through the nozzle portion 13 of said lure form.

It is apparent that various changes, such as in the absolute or relative dimension of the parts, materials used and the like, can be made without departing the spirit and scope of the invention, as will be apparent to those skilled in the art.

Having described the invention, what is claimed is:

1. As an article of manufacture, an aquatic fishing lure for use with a rod, line and hook, by virtue of which hook the lure can be attached via the line to the rod, characterized as comprising an elongate body and paired wings constituted as a unitary member formed of soft plastic, each of said paired wings being from about 2 to about 4 times wider than the average width of the elongate body and the diameter of the arc circumscribed by the tips of the paired wings on rotation being equal to or greater than the length of the elongate body, the paired wings being carried on the rearward end of the elongate body as bifurcated, flattened, twisted, balanced rearward projections which flare diametrically outwardly, one on each side of, and each being arced about, said elongate body to form, in essence, a single, continuous helical rib, the lure resembling an insect having, besides the elongate body and facsimile of a pair of insect wings, a forward knob on the elongate body which resembles an insect head capsule, a lateral opening through the forward knob which resembles eyes and which serves as a convenient point of attachment for the hook, a forward projection on the forward knob which resembles insect mouth parts, body appendages which resemble legs, antennae or other specialized insect parts, and due to such structure the lure can be actuated and rotated on casting and passage through air, and torque applied to the attached line such that, on striking water, a counter rotation is applied on the lure so that it thrashes and paddles the water to create life-like movements.

2. The article of manufacture of claim 1 wherein the interior of the elongate body is hollow, and open to the exterior only via a single outlet through the forward knob, and nozzle projection on the forward knob.

3. The article of manufacture of claim 1 wherein the elongate body is striated with circumferential parallel aligned striae such that said body resembles the segmented abdominal portion of an insect.

4. The article of manufacture of claim 1 wherein the forward projection on the forward knob located on the elongate body constitutes a tubular nozzle.

5. The article of manufacture of claim 4 wherein the tubular nozzle is funnel shaped.

6. The article of manufacture of claim 1 wherein the body appendages located on the elongate body are paired, one member of a given pair of appendages being located on opposite sides of the elongate body.

7. The article of manufacture of claim 6 wherein the appendages are located at about the forward or midportion of the elongate body, the appendages on each side of the elongate body being equal in number and of equal length, reed-like, and sufficiently flexible that they will readily vibrate with the least disturbance.

8. The article of manufacture of claim 1 wherein the fishing lure is constituted of worm type plastic.

9. As an article of manufacture, an aquatic fishing lure for use with a rod, line and hook, by virtue of which hook the lure can be attached via the line to the rod, characterized as comprising an elongate body and paired wings constituted as a unitary member formed of soft plastic, each of said paired wings being from about 2 to about 4 times wider than the average width of the elongate body and the diameter of the arc circumscribed by the tips of the paired wings on rotation being equal to or greater than the length of the elongate body, the paired wings being carried on the rearward end of the elongate body as bifurcated, flattened, twisted, balanced rearward projections which flare diametrically outwardly, one on each side of, and each being arced about, said elongate body to form, in essence, a single, continuous helical rib, the lure resembling an insect having, besides the elongate body and facsimile of a pair of insect wings, a forward knob on the elongate body which resembles an insect head capsule, a lateral opening through the forward knob which resembles eyes and which serves as a convenient point of attachment for the hook, body appendages which resemble legs, antennae or other specialized insect parts, and due to such structure the lure can be actuated and rotated on casting and passage through air, and torque applied to the attached line such that, on striking water, a counter rotation is applied on the lure so that it thrashes and paddles the water to create life-like movements.

* * * * *